XR 3,662,267

X455/54

United States P.
Reed 3,662,267
May 9, 1972

[54] SYSTEM FOR LOCATING AND COMMUNICATING WITH MOBILE UNITS

[72] Inventor: Roger R. Reed, Arlington, Mass.
[73] Assignee: Sylvania Electric Products Incorporated
[22] Filed: May 20, 1970
[21] Appl. No.: 39,100

[52] U.S. Cl. ....325/53, 325/17, 325/51, 325/55
[51] Int. Cl. ....H04b 3/60, H04b 7/00
[58] Field of Search ....325/29, 51, 53, 54, 55, 17; 343/6.5 LC, 112 PT

[56] References Cited

UNITED STATES PATENTS

| | | | |
|---|---|---|---|
| 2,685,642 | 8/1954 | Vallarino | 325/51 |
| 2,599,097 | 6/1952 | Entz | 325/55 |
| 3,310,741 | 3/1967 | Uitermark | 325/53 |
| 2,958,767 | 11/1960 | Labin | 325/17 |
| 2,885,543 | 5/1959 | Williams | 325/17 |

*Primary Examiner*—Benedict V. Safourek
*Assistant Examiner*—Joseph A. Orsino, Jr.
*Attorney*—Norman J. O'Malley, Elmer J. Nealon and David M. Keay

[57] ABSTRACT

System for posting the location of each of a plurality of mobile units, for example, police cars, at a central office. The geographic area under the surveillance of the central office is divided into sectors. Each sector has a fixed pickup terminal which radiates a carrier frequency. Five different carrier frequencies are used so that each pickup terminal radiates at a frequency different from those radiated in contiguous sectors.

When a mobile unit moves from one sector to another sector, it senses that the strongest carrier frequency present is that being radiated from the pickup terminal in its new sector. The mobile unit transmits its unique identification coded signal on the one of five companion carrier frequencies which corresponds to the carrier frequency radiated by the pickup terminal of the new sector. Only pickup terminals radiating a carrier frequency of the frequency of the pickup terminal in the new sector and tuned to receive the companion carrier frequency with the identification coded signal, and its strength is such that it is detected only by the pickup terminal in the new sector.

The pickup terminal detects the identification coded signal and transfers it over connecting wires to the central office. The central office determines the particular mobile unit by the identification coded signal and determines its location by the particular connecting wires over which the signal is received. This data is stored in a memory at the central office, and is updated each time the mobile unit leaves one sector and enters a new sector.

The system may also provide for two-way voice communication between each mobile unit and the one of several control desks at the central office to which it is assigned. Communications between a mobile unit and the pickup terminal of the sector in which it is located is by radio employing the two carrier frequencies associated with the sector. Communication from the pickup terminal to the central office is by connecting wires. When a control desk initiates a call to a particular mobile unit, the memory is searched to determine the location of the mobile unit and the control desk is connected to the proper pickup terminal.

8 Claims, 8 Drawing Figures

3662267
OR IN 455/54

INVENTOR
ROGER R. REED
BY David M. Kay
AGENT

INVENTOR
ROGER R. REED
BY David M. Key
AGENT

INVENTOR
ROGER R. REED
BY David M. Keay
AGENT

INVENTOR
ROGER R. REED
BY David M. Keay
AGENT

INVENTOR
ROGER R. REED
BY David M. Keay
AGENT

SYSTEM FOR LOCATING AND COMMUNICATING WITH MOBILE UNITS

BACKGROUND OF THE INVENTION

This invention relates to systems for determining the location of mobile units within a geographic area and also for providing communication between the mobile units and a central office. More particularly, it is concerned with systems in which information on the location of mobile units within a geographic area is continually and automatically updated at a central office and which permit communication between each mobile unit individually and the central office.

In certain types of operations employing a large number of mobile units under the control of a central office it is desirable that the locations of the various mobile units at any instant be known at the central office, and it is also desirable that the central office be able to communicate with any mobile unit individually. The advantages of such capabilities are apparent for the effective utilization of mobile units of emergency and protective organizations such as police departments. Presently used communications systems do not provide a continual updating of information on the location of all mobile units assigned to a geographic area under the control of a central office. In addition, with existing communication systems the number of communication channels are severly limited thus constraining the flow of information between the mobile units and the central office.

BRIEF SUMMARY OF THE INVENTION

The locating system in accordance with the invention automatically posts at a central office information on the location of each mobile unit within the geographic area controlled by the central office. As the mobile units move from sector to sector within the geographic area the posting of their locations is immediately changed at the central office.

The locating system includes an array of pickup terminals which are arranged throughout the geographic area. Each pickup terminal is located within a different sector of the geographic area. Each of the pickup terminals includes a signal producing means for producing an interrogating signal which is different from the interrogating signal produced by the pickup terminals in contiguous sectors. The interrogating signal is radiated throughout the associated sector by a transmitter means.

Each of the mobile units includes a receiver means which is capable of receiving interrogating signals from the pickup terminals in the array and a detection means for selecting the interrogating signal of the pickup terminal associated with the sector in which the mobile unit is located from the interrogating signals of pickup terminals in contiguous sectors. Each mobile unit also includes signal producing means for producing an identifying signal containing encoded data identifying the mobile unit and transmitter means for transmitting the identifying signal in a particular mode, for example at a particular frequency, which is determined by the interrogating signal selected by the detection means. The identifying signal is transmitted when the mobile unit moves into a new sector from another sector causing the detection means to sense the interrogating signal from the pickup terminal of the new sector. The particular mode of transmitting the identifying signal, for example the particular frequency, is different from the particular modes of transmitting determined by selecting of the interrogating signal radiated by pickup terminals in contiguous sectors.

Each of the pickup terminals includes a receiver means for receiving identifying signals transmitted in the particular mode corresponding to the interrogating signal transmitted by that pickup terminal and selected by a mobile unit within the sector. The identifying signals are transferred to the central office over connection means providing a particular path which identifies the pickup terminal.

The central office includes a memory for containing information on each mobile unit together with the pickup terminal of the sector within which it is currently located. A control means coupled to the connection means of the pickup terminal stores in the memory data on the mobile unit identified by a received identifying signal in association with the pickup terminal identified by the particular path over which the identifying signal is received.

The locating and communicating system in accordance with the invention operates in a similar manner to automatically post at a central office information on the location of each mobile unit within the geographic area. In addition the system provides for communication between each mobile unit and the central office.

This system also includes an array of pickup terminals arranged throughout the geographic area and located within different sectors. A connection means is provided between each pickup terminal and the central office, and transmission means is provided at the central office for transferring communication signals to each pickup terminal over its connection means.

Each of the pickup terminals includes a signal producing means for producing an interrogating signal which is different from the interrogating signal produced by the pickup terminals in contiguous sectors. The interrogating signal is radiated throughout the associated sector by a transmitter means. The transmitter means also radiates communication signals received from the central office in a particular mode which is different from the particular modes in contiguous sectors.

Each of the mobile units includes a first receiver means which is capable of receiving interrogating signals from the pickup terminals in the array and a detection means for selecting the interrogating signal of the pickup terminal associated with the sector in which the mobile unit is located from the interrogating signals of pickup terminals in contiguous sectors. Each mobile unit also includes a second receiver means having a connection from the detection means and operable to receive communication signals in the particular mode radiated by the pickup terminal radiating the interrogating signal selected by the detection means. A transmitter means connected to the detection means transmits in a particular mode determined by the interrogating signal selected by the detection means. The particular mode of transmitting is different from those in contiguous sectors.

Each mobile unit includes identification signal producing means for producing an identifying signal containing encoded data identifying the mobile unit and communication signal producing means for producing communication signals. The identification signal producing means is coupled to the transmitter means when the mobile unit moves into the sector from another sector causing the detection means to select the interrogating signal from the pickup terminal associated with the sector. Means are provided for coupling the communication signal producing means to the transmitter means in order to transmit communication signals in the particular mode.

Each pickup terminal includes receiver means for receiving both identifying signals and communication signals transmitted in the particular mode corresponding to the interrogating signal selected by a mobile unit within the sector. The received signals are transferred to the central office over the connection means between the pickup terminal and the central office.

The central office includes a memory for containing information on each mobile unit together with the pickup terminal of the sector within which it is currently located. A control means coupled to the connection means from the pickup terminals stores in the memory data on the mobile unit identified by a received identifying signal in association with the pickup terminal identified by the particular connection means over which the identifying signal is received. Communication signal receiver means are coupled to a connection means in order to receive communication signals being transmitted from a pickup terminal.

BRIEF DESCRIPTION OF THE DRAWINGS

Additional objects, features, and advantages of locating and communicating systems in accordance with the invention will be apparent from the following detailed discussion together with the accompanying drawings wherein.

DETAILED DESCRIPTION OF THE INVENTION

Locating System — General

Figure 1:
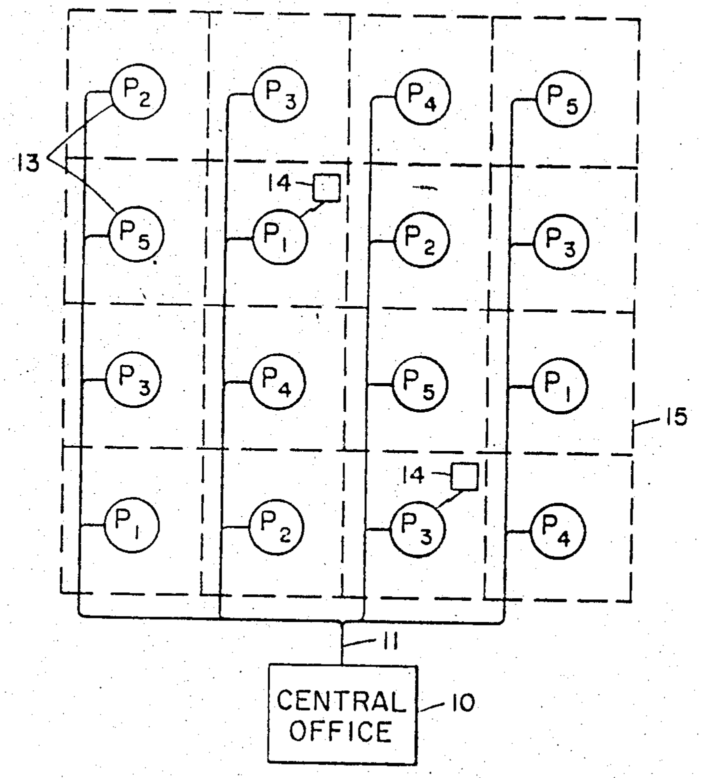
FIG. 1 is a diagrammatic representation illustrating the locating system of the invention.

The locating system in accordance with the invention is illustrated by the diagrammatic representation of FIG. 1. The system includes a central office 10 connected by separate sets of lines 11 to each of a plurality of fixed pickup terminals 13. The pickup terminals 13 are arranged in an array throughout the geographical area under the control of the central office. Each pickup terminal 13 surveys a sector of the geographical area, as indicated by the dashed lines 15. Each of the pickup terminals 13 transmits an interrogating radio signal within its sector. In order to distinguish between contiguous sectors each pickup terminal transmits an interrogating signal which is distinguishable from the interrogating signals transmitted by pickup terminals in contiguous sectors.

When a mobile unit 14 moves from one sector to another sector within the geographic area, it senses the change in received interrogating signals and transmits its particular identification coded signal at a frequency which can be received by the pickup terminal 13 in the sector but not by the pickup terminals 13 in the contiguous sectors. This signal is received by the pickup terminal 13 in the particular sector and transferred over the lines 11 from that pickup terminal to the central office 10. At the central office 10 the information that the particular mobile unit 14, identified by the coded signal, is located within the sector of the particular pickup terminal 13, identified by its particular lines 11, is posted.

In order for a mobile unit 14 to detect when it has moved from one sector to another, each pickup terminal 13 transmits an interrogating signal which is different from the interrogating signals in contiguous sectors. For example, one layout which enables a geographic area of any number of sectors to meet this requirement with five different interrogating signals is illustrated by the diagrams of portions of geographic areas shown in FIGS. 1 and 2. The pickup terminals and their associated sectors, as indicated by dashed lines 15, are designated P1 through P5, each designation indicating one of five different interrogating signals.

As will be explained in greater detail hereinbelow each pickup terminal provides one of five different interrogating signals, for example, by transmitting at one of five different carrier frequencies. Pickup terminals with the same P-designation provide the same interrogating signal. Each mobile unit 14 within the geographic area senses which of the five frequencies received is strongest. The mobile unit 14 transmits its identification coded signal either on the same frequency as the strongest received frequency or on a companion frequency which only pickup terminals of that P-designation are enabled to receive. The strength of the signal transmitted by a mobile unit 14 is such that pickup terminals of the same P-designation in other sectors are sufficiently distant so that they do not respond.

In summary, the system operates in the following manner. When a mobile unit 14 moves into one sector from another sector, it senses that the frequency which is the strongest of the five frequencies being received has changed. On the appropriate frequency for that strongest received signal the mobile unit automatically transmits its identification code signal. That signal is received and detected only by the pickup terminal 13 of the sector just entered. The pickup terminal 13 automatically transfers the identification code signal over lines 11 to the central office 10. At the central office 10 the particular pickup terminal 13 is identified by the particular lines 11 on which the signal is received and the particular mobile unit 14 is identified by its unique code signal. Thus, the central office receives information for automatically posting the information on the particular sector in which the particular mobile unit 14 is located.

Locating System — Description

Figure 3:
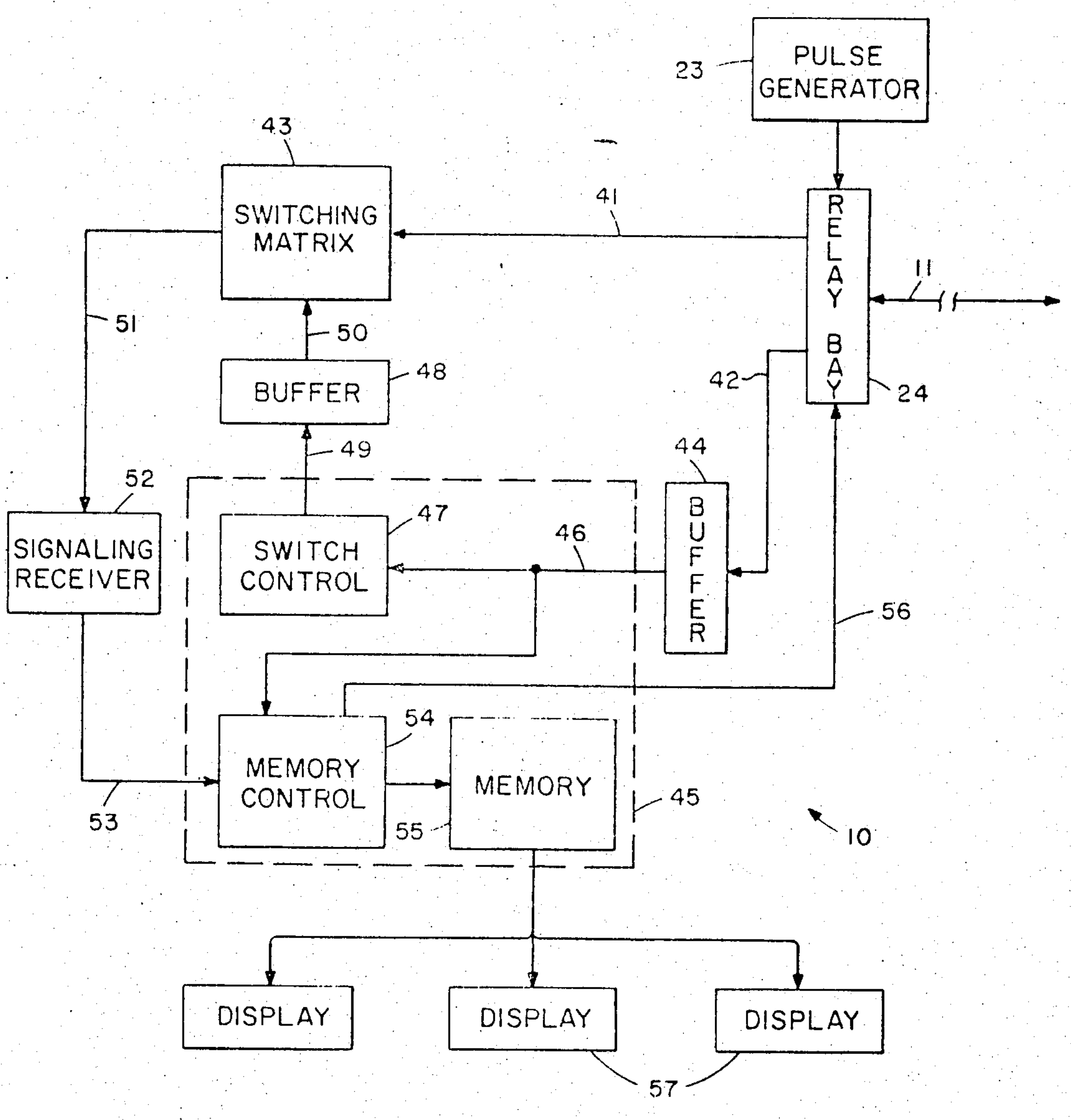
FIG. 3 is a block diagram of the central office portion of the locating system in accordance with the invention.
Figure 4:
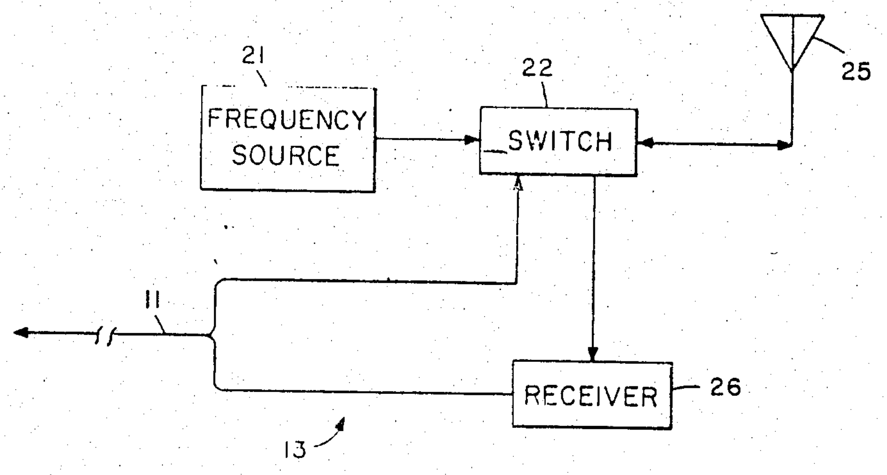
FIG. 4 is a block diagram of a fixed pickup terminal employed in the locating system of the invention.

The central office 10 of the locating system according to the invention is illustrated in block diagram form in FIG. 3. FIG. 4 is a block diagram of a fixed pickup terminal 13, and FIG. 5 is a block diagram of a mobile unit 14.

As illustrated in FIG. 4 each pickup terminal 13 includes a frequency source 21 which produces a carrier frequency at one of five different frequencies in accordance with its assigned sector in the geographic area. The output of the frequency source 21 is coupled to an antenna 25 through a switch 22. The switch 22 is actuated by signals from the central office 10 over lines 11 in order periodically to connect the output of the frequency source 21 to the antenna 25; (for example, connect for 1 second and disconnect for 1 second). Thus, the antenna 25 radiates the carrier frequency in bursts. Since the switch 22 is controlled by the central office 10 transmission from all the pickup terminals 13 in the geographic area may be synchronized.

Each pickup terminal 13 also includes a receiver 26 which is connected to the antenna 25 through the switch 22. The switch 22 is actuated by incoming signals from the antenna 25 during intervals between the transmission bursts of carrier frequency in order to connect the antenna 25 to the receiver 26. The receiver 26 is tuned to receive only signals of the proper transmitting frequency for a mobile unit 14 located within the sector. The receiver 26 detects signals at this frequency if they are sufficiently strong to have come from within the sector and not from another sector of the same P-designation. The output of the receiver 26 is connected to lines 11 to the central office 10.

Figure 5:
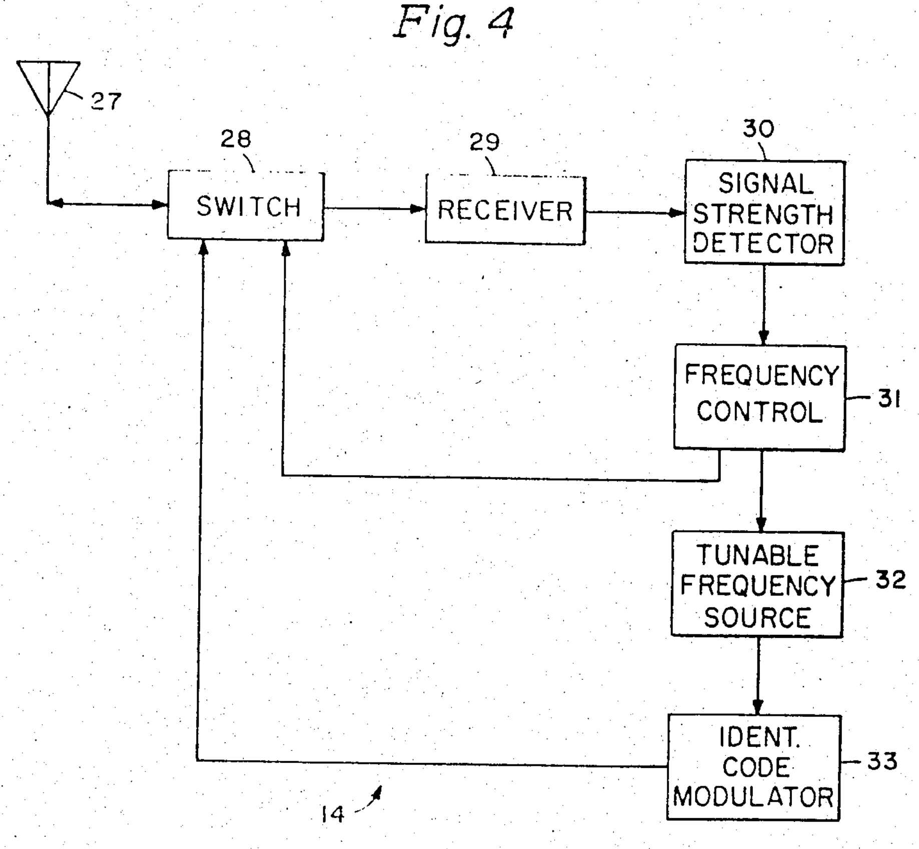
FIG. 5 is a block diagram of a mobile unit of the locating system of the invention.

As illustrated in the block diagram of FIG. 5 each mobile unit 14 includes a receiver 29 which is coupled to an antenna 27 through a switch 28. The switch 28 is actuated by the simultaneous bursts of carrier frequencies received by the antenna 27 from the pickup terminals 13 so as to connect the antenna 27 to the input of the receiver 29. The receiver 29 receives the five different transmitting frequencies from the pickup terminals 13 and produces signals indicative of the amplitude of each received frequency.

The output signal of the receiver 29 is applied to a signal strength detector 30. The signal strength detector 30 receives the output signals from the receiver 29 and determines which of the five received frequencies is of the greatest amplitude. A signal indicating which frequency is of the greatest amplitude is produced at the output.

The mobile unit 14 also includes a tunable frequency source 32. The frequency source is capable of being tuned to any of five predetermined frequencies. The appropriate frequency is determined by a frequency control 31 in response to the signal received from the signal strength detector 30. The frequency control 31 also actuates the switch 28 in a manner to be explained hereinbelow.

The output of the tunable frequency source 32 is connected to an identification code modulator 33. The identification code modulator 33 modulates the carrier frequency from the frequency source 32 with a unique identifying signal designating that particular mobile unit. The output of the identification code modulator 33 is coupled to the antenna 27 through the switch 28. The switch 28 is actuated by the frequency control 31 to connect the identification code modulator 33 to the antenna 27 during the interval between bursts of the received frequencies which occurs after the output of the signal strength detector 30 indicates the received frequency of greatest amplitude has changed from one frequency to another.

The central office 10 of the locating system according to the invention is illustrated in the block diagram of FIG. 3. Each of the pickup terminals 13 is connected to a relay bay 24 of the central office by separate lines 11. A plurality of lines 42 connects the relay bay 24 to a buffer 44 and the buffer is connected to a central processor and memory unit 45 by lines 46. A plurality of lines 41 are connected between the relay bay 24 and a switching matrix 43. A pulse generator 23 for synchronizing the transmission of carrier frequencies from the pickup terminals 13 is also connected to the relay bay 24.

The central processor and memory unit 45 may be an appropriately programmed general purpose computer, but is illustrated in FIG. 3 in functional block diagram form including a switch control 47, a memory 55, and a memory control 54. Lines 46 from the buffer 44 are connected to the switch control 47. The switch control 47 is connected to the switching matrix 43 through lines 49, buffer 48, and lines 50. The switch control 47 controls the connections made by the switching matrix 43.

The central office 10 includes a signaling receiver 52 having an input connection line 51 from the switching matrix 43 and an output connection line 53 to the memory control 54 of the central processor and memory unit 45. The signaling receiver 52 receives identification code signals, decodes the signals, and provides the identification code data to the memory control 54 in a suitable format.

The memory control 54 has a first input by way of lines 46 which provides information for identifying pickup terminals as will be explained hereinbelow and a second input by way of line 53 which provides identification data on mobile units. The memory control 54 causes the received data associating mobile units with pickup terminals to be stored in the memory 55. The memory control 54 is also connected to the relay bay 24 by line 56 for resetting the relay bay. Various displays 57 are connected to the memory 55 for providing ready access to the information on the location of the mobile units as stored in the memory 55.

Locating System — Operation

The system as described operates in the following manner to post and up-date continually the information stored in the memory and presented on the displays at the central office indicating the sector of the geographic area under surveilance in which each mobile unit is located.

The frequency source 21 (FIG. 4) in each pickup terminal 13 produces a continuous signal at one of the five carrier frequencies in accordance with its sector designation. The pulse generator 23 in the central office 10 (FIG. 3) is connected to each of the pickup terminals 13 over lines 11 by appropriate connections within the relay bay 24. The pulse generator 23 actuates all of the switches 22 of all of the pickup terminals 13 simultaneously so that each pickup terminal 13 broadcasts its carrier frequency from its antenna 25 in one second bursts with 1 second intervals between bursts.

The bursts of carrier frequencies at the five different frequencies are received at the antenna 27 of each mobile unit 14 (FIG. 5) in the geographic area. The presence of the frequency bursts actuates the switch 28 applying the frequencies to the receiver 29. The five frequencies are detected by the receiver 29 and signals indicative of the relative amplitudes of the five frequencies are passed to the signal strength detector 30. The signal strength detector 30 determines which of the five frequencies being received is the strongest (has the greatest amplitude). A signal indicative of the strongest frequency is applied to the frequency control 31 which controls the output frequency of the tunable frequency source 32.

When a mobile unit 14 moves from one sector to another (FIG. 1) the frequency detected as strongest is different from the frequency detected as strongest during the preceding burst of frequencies. In response to the changes in signal from the signal strength detector 30, the frequency control 31 tunes the frequency source 32 to the appropriate frequency and also actuates the switch 28 to connect the output of the tunable frequency source 32 as modulated by the identification code modulator 53 to the antenna 27 during the following interval between bursts. Thus, immediately following the burst of frequencies, the mobile unit 14 broadcasts its unique identification code on the carrier frequency which the nearest pickup terminal 13 is tuned to receive. The signal is transmitted continually during the one second interval, and only during the one second interval after the change in the strongest received frequency is detected.

Figure 2:
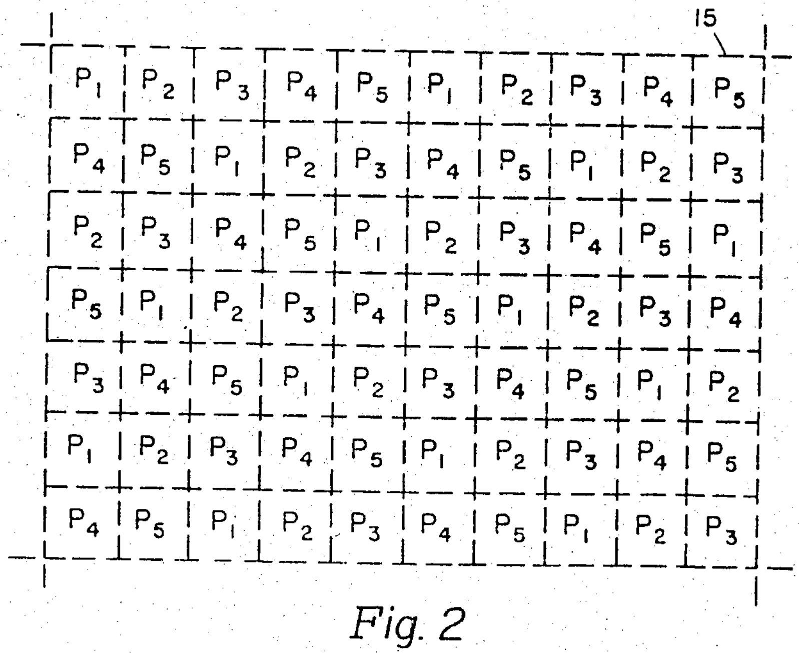
FIG. 2 is a layout diagram for illustrating the manner in which a geographic area covered by the system of the invention may be divided into sectors, each containing a pickup terminal, for locating mobile units within the geographic area.

The signal containing the information of the identification code of the particular mobile unit 14 is received by the antenna 25 of the pickup terminal 13 (FIG. 4) for the same sector. The received signal actuates the switch 22 and is applied to the receiver 26 which is tuned to the carrier frequency of the receiver signal. As indicated by the diagrams of FIGS. 1 and 2 other pickup terminals of the same P-designation which are tuned to the same frequency are sufficiently distant from the particular sector so that the received signal does not exceed the minimum threshold level required for the switch 22 to be actuated. The receiver 26 of the pickup terminal 13 within the sector detects the received signal and transfers a signal containing the identification code of the mobile unit 14 over lines 11 to the central office 10.

The identification code signal from the pickup terminal 13 is carried over the particular lines 11 of the pickup terminal 13 to the relay bay 24 of the central office 10 (FIG. 3). The incoming signal causes the relays in the relay bay 24 to connect the lines 11 with appropriate lines 41 and 42 for the particular pickup terminal 13 involved. The signal is conveyed over appropriate lines 42 through buffer 44 and by appropriate lines 46 to the central processor and memory unit 45. The presence of a signal on particular lines 46 causes the switch control 47, acting over lines 49, buffer 48, and lines 50 to actuate the switching matrix 43 so as to connect the appropriate lines 41 carrying the incoming signal from lines 11 to line 51 which is connected to the signaling receiver 52. Thus, the incoming signal carrying the identification code of the mobile unit 14 is transferred over the appropriate lines 11 through contacts in the relay bay 24 to the appropriate lines 41, and through switching matrix 43 to the line 51 to the signaling receiver 52.

The signaling receiver 52 decodes the identification code of the particular mobile unit 14 and transfers this data in an appropriate format to the memory control 54 of the central processor and memory unit 45. The other input to the memory control 54 is over appropriate lines 46 indicating the particular pickup terminal 13 which is transferring the incoming signal to the central office 10. The memory control 54 thus receives both information as to the identification of the particular mobile unit 14 involved and as to the particular pickup terminal 13 from which the identification information is being received. The memory control 54 directs this data to the memory 55 for storage, replacing previously stored information on that mobile unit. After causing the data to be stored in the memory 55, the memory control 54 produces a signal on line 56 to reset the relay bay 24. This action resets all the other switching elements of the central office 10 and also holds the lines 11 from the particular pickup terminal 13 disconnected from the lines 41 and 42 during the remainder of the interval.

Thus, the updated information on the sector of the geographic area in which the particular mobile unit 14 is located is posted in the memory 55 and the system is reset. The posted information is available to be read out from the memory 55 in various forms of the displays 57.

Locating and Communicating System — General

The locating system in accordance with the invention as described may be modified so as also to include the capability for providing voice communication between each mobile unit within the geographic area and an assigned control desk at the central office. The elements of a locating and communicating system in accordance with the invention are arranged similar to the representation illustrated in FIG. 1. As illustrated in the block diagrams of FIGS. 6, 7, and 8 the system includes a central office 70, an array of pickup terminals 71 arranged throughout the geographic area, and a plurality of mobile units 72, respectively. Communication between the mobile unit 72 and the fixed pickup terminals 71 is by radio, and communication between the pickup terminals 71 and the central office 70 is by lines 69.

Figure 6:
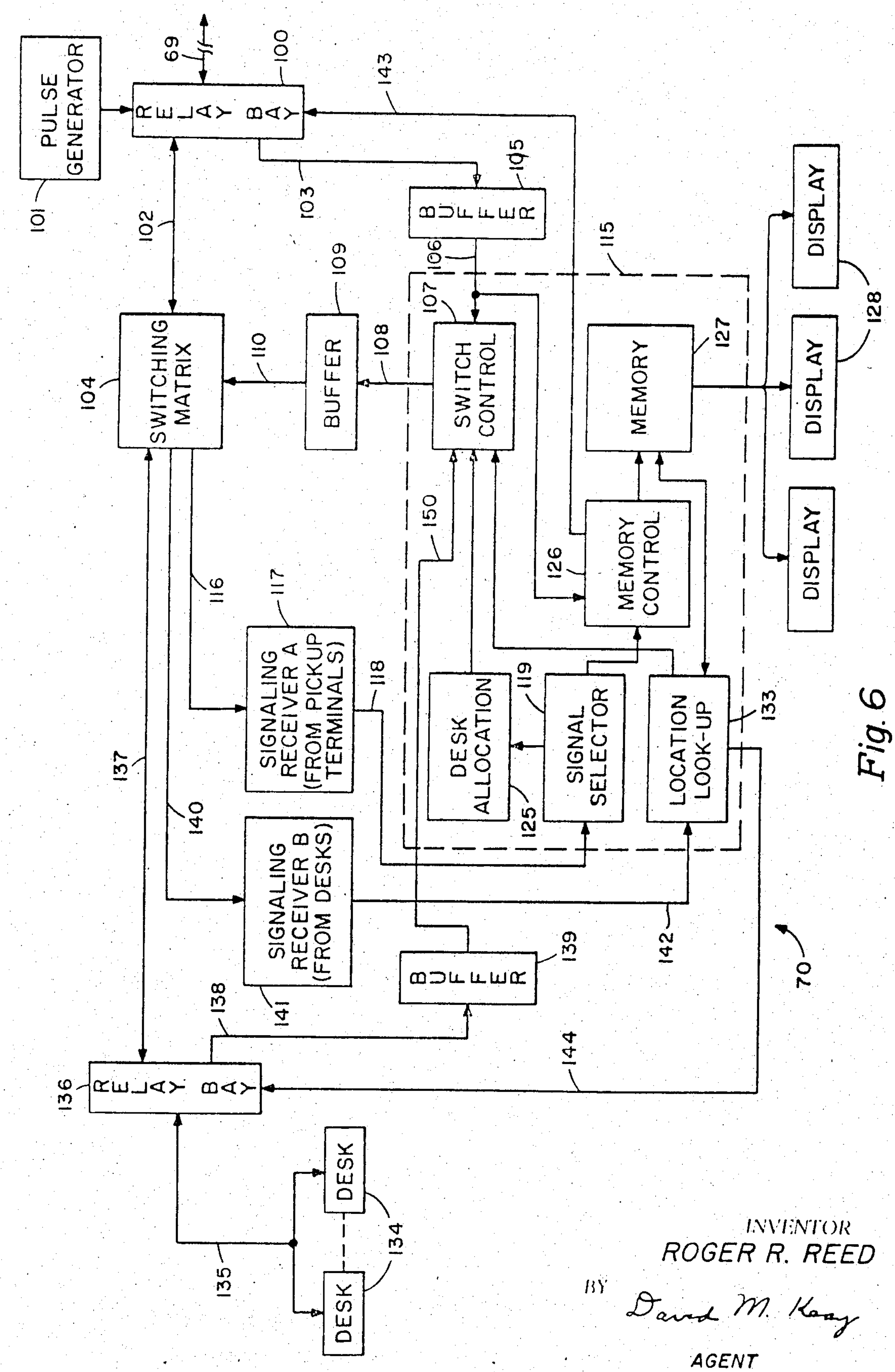
FIG. 6 is a block diagram of the central office portion of the locating and communicating system of the invention.

For illustrative purposes, as shown in FIG. 6, the central office 70 includes several control desks 134 each of which may control the activities of several assigned mobile units 72. Alternatively, each control desk 134 may control several sectors of the geographic area and direct the activities of all mobile units 72 as they come within those sectors.

The system includes the same functional elements as shown in FIGS. 3, 4, and 5 and as described hereinabove and operates in the same manner to locate the mobile units 72 as they move from sector to sector and to store the updated information in a memory 127. In addition each mobile unit 72 may initiate voice communication with its assigned control desk 134 at the central office 70. Communication from the mobile unit 72 to the pickup terminal 71 is by radio and from the pickup terminal 71 to the central office 70 is over lines 69. At the central office 70 the call is automatically directed to the proper control desk 134 for the calling mobile unit 72. Voice communication may also be initiated by each control desk 134 at the central office 70 to any of its assigned mobile units 72. When a control desk 134 signals for a particular mobile unit 72, the memory 127 is automatically checked to determine the location of that mobile unit 72 and then the desk is connected to the appropriate pickup terminal 71.

Locating and Communicating System — Description

Figure 7:
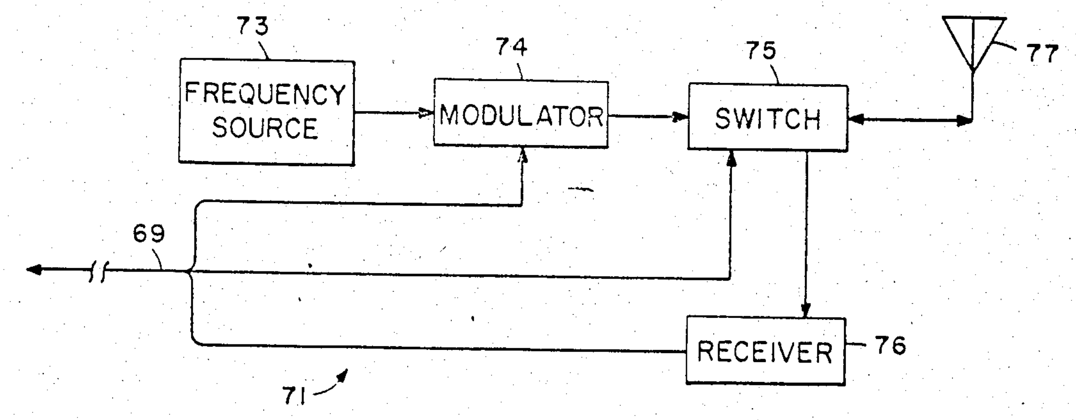
FIG. 7 is a block diagram of a fixed pickup terminal employed in the locating and communicating system of the invention.

A pickup terminal 71 of the locating and communicating system in accordance with the invention is illustrated in FIG. 7. The pickup terminal 71 includes a frequency source 73 which produces a carrier frequency at one of five different frequencies in the manner explained previously. The output of the frequency source 73 is connected to a modulator 74 which is controlled from the central office 70 over lines 69. The output of the modulator 74 is coupled to an antenna 77 through a switch 75. The switch 75 is actuated by signals from the central office 70 over lines 69.

Each pickup terminal 71 includes a receiver 76 which is also connected to the antenna 77 through the switch 75. The switch 75 connects the antenna 77 to the receiver 76 during incoming signals from a mobile unit 72 as will be explained hereinbelow. The receiver 76 is tuned to receive only signals from the frequency transmitted by a mobile unit 72 located within the sector. The output of the receiver 76 is connected through lines 69 to the central office 70.

Figure 8:
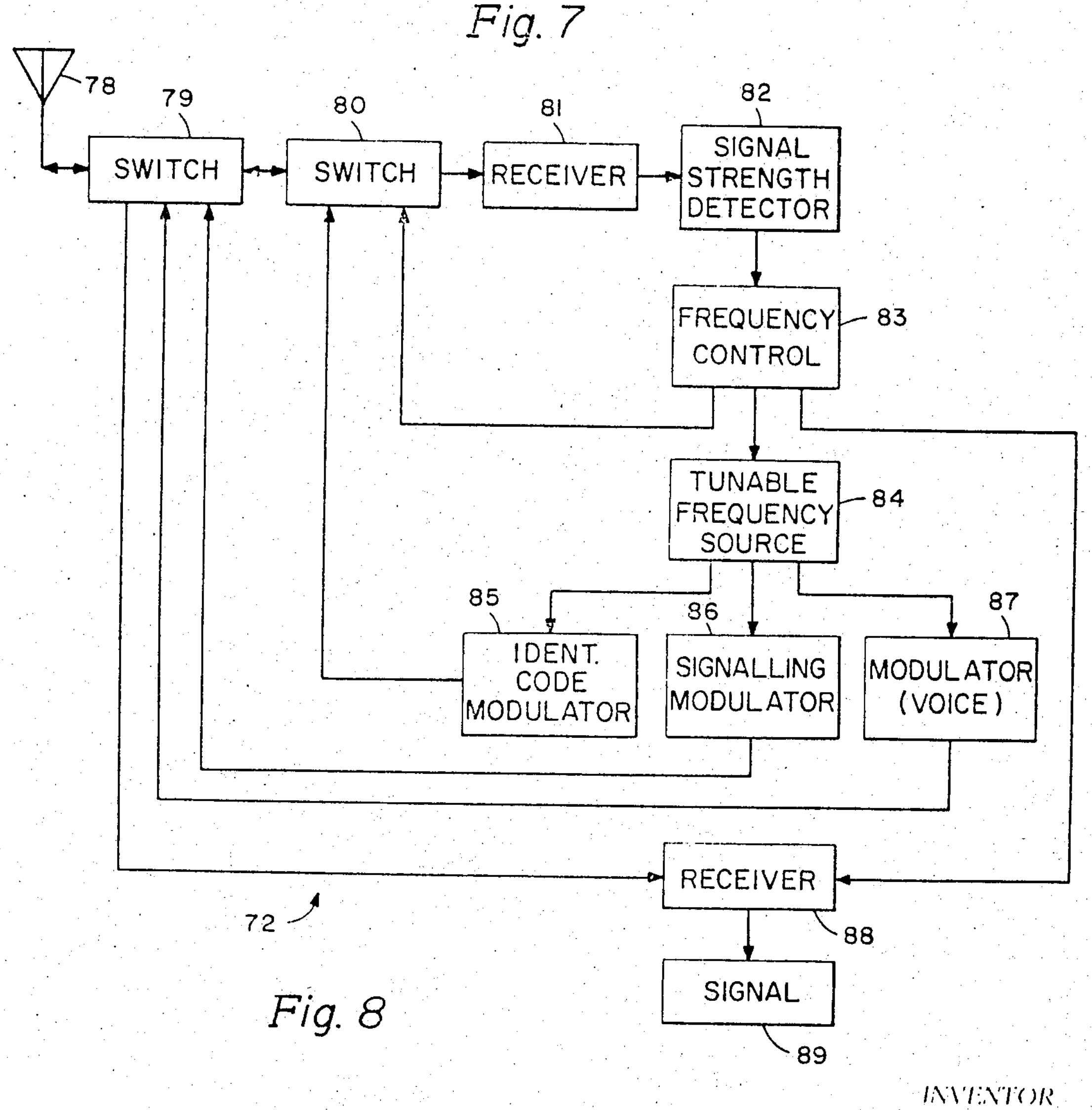
FIG. 8 is a block diagram of a mobile unit of the locating and communicating system of the invention.

As illustrated in the block diagram of FIG. 8 each mobile unit 72 includes an antenna 78, a switch 80, a receiver 81, a signal strength detector 82, a frequency control 83, a tunable frequency source 84, and an identification code modulator 85 which function similarly to the corresponding items in the previously described embodiment of the invention. In addition, the mobile unit 72 as illustrated in FIG. 8 includes a signaling modulator 86 which modulates the carrier frequency from the frequency source 84 with a coded signal which serves to identify the particular mobile unit and also which contains an indication that the mobile unit desires to communicate with its control desk 134 at the central office. The output of the signaling modulator 86 is coupled to the antenna 78 through a switch 79 which is manually operated when it is desired to signal the central office 70.

A voice modulator 87 is also connected to the output of the tunable frequency source 84 to enable the carrier frequency from the frequency source 84 to be voice modulated. The output of the modulator 87 is coupled to the antenna 78 through the manually operated switch 79.

The mobile units 72 includes a receiver 88 which is also connected to the antenna 78 through the manual switch 79. The receiver 88 is tuned to the proper frequency for receiving signals from the pickup terminal 71 of the sector in which it is located by the frequency control 83. The receiver 88 converts incoming voice signals to audible sound, and also is connected to a single device 89 to provide an indication when the mobile unit 72 is being called by its control desk 134.

The central office 70 of the locating and communicating system according to the invention is illustrated in the block diagram of FIG. 6. Each of the pickup terminals 71 is connected to a relay bay 100 of the central office 70 by separate lines 69. The relay bay 100, pulse generator 101, switching matrix 104, switch control 107, memory control 126, memory 127, and buffers 105 and 109 perform the functions as described for corresponding items in the discussion of the previous embodiment of the invention.

The signaling receiver A 117 has an input line 116 from the switching matrix 104 and an output line 118 to a signal selector 119 in the central processor and memory unit 115. The central processor and memory unit 115 may be an appropriately programmed general purpose computer, but is illustrated in FIG. 6 in functional block diagram form. The signaling receiver A 117 receives the incoming identification signals, decodes the signals, and transfers the information to the signal selector 119 in a suitable format. The signal selector 119 determines from the received information whether the mobile unit is signaling in order to initiate a call or is signaling to update the posting of its location.

If a signal indicates that the mobile unit is signaling to post a change in its location, the signal selector 119 transfers identification data on the mobile unit to the memory control 126. The memory control 126 operates in the manner previously described to store the data on the mobile unit and on its location in the memory 127.

If the signal from the signaling receiver A 117 indicates that the mobile unit is signaling to initiate a call, the signal selector 119 transfers identification data on the mobile unit to the desk allocation unit 125. Data on the control desk 134 to which each mobile unit 72 is assigned is stored in the desk allocation unit 125. When the desk allocation unit 125 receives a signal from the signal selector 119 identifying a particular mobile unit 72, it produces an output signal to the switch control 107 indicating the control desk 134 to which the lines 69 from the particular pickup terminal 71 is to be connected.

The control desks 134 are connected by separate lines 135 to a relay bay 136. A plurality of lines 137 connect the relay bay 136 to the switching matrix 104. A plurality of lines 138 are also connected from the relay bay 136 to the switch control 107 through a buffer 139 and lines 150.

A signaling receiver B 141 is connected to the switching matrix 104 by input line 140 and to the central processor and memory unit 115 by an output line 142. The signaling receiver B 141 is adapted to receive calling signals from a control desk 134 when connected to a control desk 134. The calling signal which indicates the particular mobile unit 72 being called by the desk is decoded by the signaling receiver B 141 and the identification of the mobile unit 72 is provided on output line 142 in a suitable format. Line 142 is connected to a location lookup unit 133 within the central processor and memory unit 115. The location lookup unit 133 receives the information identifying a particular mobile unit 72, searches the memory 127 to determine the sector in which the mobile unit is located, and produces an output signal to the switch control 107 indicating the particular pickup terminal 71 to which the desk 134 is to be connected. The location lookup unit also has a connection 144 to the relay bay 136 for causing the relay bay 136 to disconnect the control desk 134 from lines 138.

Locating and Communicating System — Locating Operation

The locating and communicating system in accordance with the invention as illustrated in the block diagrams of FIGS. 6, 7, and 8 operates in substantially the same manner as the locating system illustrated in FIGS. 3, 4, and 5 to post the information on the location of each mobile unit 72 in the geographic area in the memory 117 for display in any desired manner by the displays 128. When pickup terminal 71 is not being involved in voice communication, its frequency source 73 produces the carrier frequency which passes unmodulated through modulator 74 to the switch 75. The switch 75 is actuated over lines 69 by the pulse generator 101 at the central office 70 as previously described whereby bursts of carrier frequency are radiated from the antenna 77.

Each mobile unit 72 with the manual switch 79 properly set for posting location information receives the bursts of frequencies of five different carrier frequencies at the antenna 78. Switch 80 is actuated by the burst of frequencies to conduct the frequencies to the receiver 81 wherein they are detected and signals indicative of their amplitudes are conveyed to the signal strength detector 82. The signal strength detector 82 detects which of the received five frequencies is the strongest and transfers this information to the frequency control 83.

The frequency control 83 tunes the tunable frequency source 84 to the appropriate frequency as determined by the strongest frequency being received. Upon receiving information that the strongest signal has changed from being of one frequency to being of another frequency, the frequency control 83 causes switch 80 to be actuated during the interval following the burst of frequencies so that the carrier frequency of the frequency source 84 modulated by the identification code modulator 85 is passed through switch 80 to the antenna 78.

When the signal from a mobile unit 72 is received at the antenna 77 of the pickup terminal 71 during the interval between bursts, the signal is detected by the receiver 76 and transferred over lines 69 to the central office 70.

At the central office the incoming signal on particular lines 69 from the particular pickup terminal 71 actuates relays in the relay bay 100 to connect the particular lines 69 to appropriate lines 102 and 103 to the switching matrix 104 and through buffer 105 to lines 106 to the central processor and memory unit 115, respectively. As explained previously, the switch control 107 of the central processor and memory unit 115 by way of lines 108, buffer 109, and lines 110 causes the switching matrix 104 to connect the input line 116 of the signaling receiver A 117 to the appropriate lines 102. The incoming signal is received by the signaling receiver A 117 and decoded to provide a signal of appropriate format containing the identification code data of the particular mobile unit 72. This data is transferred over line 118 to the signal selector 119 which determines that the incoming signal is for the purpose of updating information on the location of the mobile unit and not for initiating voice communication. The signal selector 119 transfers identification data on the mobile unit 72 to the memory control 126. The memory control 126 receives the data from the signal decoder 119 identifying the particular mobile unit 72 and information on the particular pickup terminal 71 from which the signal is coming on lines 106. The memory control 126 causes this information to be stored in the memory 127 in place of the stored information regarding the location of the particular mobile unit. The memory control 126 then resets the central office 70 by a reset signal over line 143 to the relay bay 100 as explained previously.

Locating and Communicating System — Voice Communication (from mobile unit)

The system illustrated in FIGS. 6, 7, and 8 may also be employed for providing voice communication between each mobile unit 72 and its assigned control desk 134. In order for communication to be initiated by the mobile unit 72, the switch 79 in the mobile unit 72 is actuated manually so as to connect the output of the signaling modulator 86 to the antenna 78. At the same time, connections between switch 79 and switch 80 are broken. A delay of 1 or 2 seconds may be incorporated in the action of the switch 79 in order to insure that the transmission of location information is not interrupted. Transmission from the antenna 78 occurs continually during the intervals between bursts of the received frequencies.

As explained previously, the tunable frequency source 84 is tuned to produce a particular output frequency determined by the sector in which the mobile unit 72 is located. The signaling modulator 86 applies a signal to the carrier frequency which identifies the particular mobile unit 72 and indicates that the mobile unit is signaling the central office 70.

The signal is transmitted continually from the antenna 78 of the mobile unit 72 and is received at the antenna 77 of the pickup terminal 71 in the sector in which the mobile unit 72 is located. The signal is transferred from the antenna 77 through the switch 75 to the receiver 76. The receiver 76 is tuned to the proper frequency for mobile units located within its sector. As explained previously, signals of the same frequency from another sector of the same P-designation are below the threshold level required to actuate the switch 75. The received signal is detected by the receiver 76 and the detected signal is carried over lines 69 to the central office 70.

At the central office 70 the incoming signal is received over the particular lines 69 from the particular pickup terminal 71 and applied to the relay bay 100. The incoming signal actuates the relay bay 100 to connect the particular lines 69 to appropriate lines 102 and 103 from the relay bay 100 to the switching matrix 104 and through the buffer 105 to the appropriate lines 106 into the central processor and memory unit 115. In addition, the incoming signal actuates the relay bay 100 to disconnect the pulse generator 101 from the lines 69 to the particular pickup terminal 71. This action also occurs in the previously described operation of automatically updating the posting of the location of the mobile unit 72, but is not significant to that operation.

The switch control 107 of the central processor and memory unit 115 receives the information from lines 106 and produces control signals over lines 108, through buffer 109, and over lines 110 to cause the switching matrix 104 to connect the appropriate lines 102 to input line 116 to the signaling receiver A 117. The signaling receiver A 117 decodes the incoming signal from the pickup terminal 71 and transfers the encoded data over output line 118 to the signal selector 119.

The signal selector 119 determines from the received data that the mobile unit is signaling to place a call and transfers the identification data on the particular mobile unit to the desk allocation unit 125. The desk allocation unit 125 contains stored information on the control desks 134 to which each mobile unit 72 is assigned. The desk allocation unit 125 transfers data to the switch control 107 identifying the particular control desk 134 to which the call is to be directed. The switch control 107 produces signals over lines 108, through buffer 109, and overlines 110 causing the switching matrix 104 to disconnect line 116 from the lines 102 and to connect particular lines 137 from the particular control desk 134.

The incoming signal is thus transferred through the switching matrix 104 and over the proper lines 137 to the assigned control desk 134 to relay bay 136. The incoming signal actuates relay bay 136 to connect the appropriate lines 137 to the appropriate lines 135 to the particular control desk 134.

When the control desk 134 responds to the incoming signal, voice signals from the desk pass over appropriate lines 135, through the relay bay 136, over the appropriate lines 137, through the switching matrix 104, over the appropriate lines 102, through relay bay 100, and over the appropriate lines 69 to the particular pickup terminal 71. The signals are applied to the modulator 74 (FIG. 7) which voice modulates the output of frequency source 73. Signals are also applied to the switch 75 actuating it so as to couple the output of the modulator 74 to the antenna 77.

The signals from the pickup terminals 71 are received at the antenna 78 of the mobile unit 72 (FIG. 8) and actuate switch 79 causing the incoming signals to be directed to the receiver 88. Switch 79 may then be actuated manually to disconnect the output of the signaling modulator 86 from the antenna 78 and permit two-way voice communication between the mobile unit 72 and the control desk 134 at the central office 70.

Upon termination of communication, the switch 79 in the mobile unit 72 is reset manually to restore the mobile unit to automatic operation for transmitting information on its location. When the control desk 134 indicates completion of communication over lines 135, the relay bay 136 disconnects lines 135 from lines 137. This action causes the switching matrix 104 to disconnect lines 102 which in turn causes the relay bay 100 to reset to its original state disconnecting lines 102 and connecting the pulse generator 101 to the lines 69 to the particular pickup terminal 71.

Locating and Communicating System — Voice Communication (from control desk)

In order for a control desk 134 to establish voice communication, the desk initiates a calling signal over its appropriate lines 135. The calling signal actuates relay bay 136 causing it to connect lines 135 from the desk to appropriate lines 137 and 138 to the switching matrix 104 and through buffer 139 to lines 150 to the central processor and memory unit 115. The lines 150 are connected to the switch control 107 of the central processor and memory unit 115 and cause the switch control 107 to actuate the switching matrix 104 so as to connect the appropriate lines 137 to the input line 140 of the signaling receiver B 141.

When the connection from the control desk 134 to the signaling receiver B 141 is complete, the desk 134 produces a signal indicating the particular mobile unit 72 to be called. The signaling receiver B 141 decodes the signal and transfers the data over line 142 to the location lookup unit 133 in the central processor and memory unit 115. The location lookup unit 133 searches the memory 127 to ascertain the sector in which the mobile unit 72 being called is located. The location lookup unit 133 conveys to the switch control 107 identifying data on the particular pickup terminal 71 for that sector. The switch control 107 causes the switching matrix 104 to disconnect the appropriate lines 137 from line 140 and make connections to appropriate lines 102 for the particular pickup terminal 71.

Connection of lines 137 to lines 102 actuates the relay bay 100 to connect lines 102 to the proper lines 69 to the particular pickup terminal 71. Pulse generator 101 is disconnected from the particular lines 69 to the pickup terminal 71. The location lookup unit 133 also produces a signal over line 144 to the relay bay 136 causing the relay bay 136 to disconnect the lines 138 and reset the central processor and memory unit 115.

The calling signal is carried over lines 69 to the modulator 74 and also to the switch 75 of the particular pickup terminal 71 (FIG. 7). The signal actuates the switch causing the signal to be radiated from the antenna 77.

The calling signal received by the antenna 78 of the mobile unit 72 (FIG. 8) actuates the switch 79 connecting the antenna 78 to the receiver 88. The receiver 88 causes the signal device 89 to indicate that the mobile unit is being signaled from the central office 70. Switch 79 is then operated manually to permit two-way voice communication between the control desk 134 at the central office and the mobile unit 72 and also to break the connections between switches 79 and 80. Upon termination of communication, the connections are broken in the manner described previously.

CONCLUSION

The systems in accordance with the invention as described provide a central office with current information on the location of a plurality of mobile units within a geographic area under the surveillance of the central office. The system may be employed, for example, to control the operations of police patrol vehicles within a city or portion of a city. The pickup terminal equipment may be mounted on utility poles to provide a pattern of sectors covering the area. The displays may be in any desired form including display panels at individual control desks and map-type displays. In addition, the stored data may be recorded periodically to provide a permanent log on the positions of all the vehicles.

The locating system as described may be employed in conjunction with present radio communication systems. The locating and communicating system as described, however, provides individual channels of communication to each sector. In addition the system as shown requires only five different radio communication channels regardless of the number of vehicles or the size of the area.

While there has been shown and described what are considered preferred embodiments of the present invention, it will be obvious to those skilled in the art that various changes and modifications may be made therein without departing from the invention as defined in the appended claims.

What is claimed is:

1. A locating system for determining the location of mobile units within a geographic area comprising:
   - a central office;
   - an array of pickup terminals arranged throughout the geographic area, each pickup terminal being located within a different sector of the geographic area;
   - each pickup terminal including
     - signal producing means for producing an interrogating signal which is different from the interrogating signal produced by the pickup terminals in contiguous sectors, and
     - transmitter means for radiating the interrogating signal throughout the associated sector;
   - a plurality of mobile units adapted to move from sector to sector throughout the geographic area;
   - each mobile unit including
     - receiver means for receiving interrogating signals from the pickup terminals in the array,
     - detection means for selecting the interrogating signal of the pickup terminal associated with the sector in which the mobile unit is located from the interrogating signals of pickup terminals in contiguous sectors,
     - signal producing means for producing an identifying signal containing encoded data identifying the mobile unit, and
     - transmitter means for transmitting the identifying signal in a particular mode determined by the interrogating signal selected by said detection means when the mobile unit moves into the sector from another sector causing the detection means to select the interrogating signal from the pickup terminal associated with said sector, the particular mode of transmitting being different from the particular modes of transmitting determined by selecting of the interrogating signals radiated by pickup terminals in sectors contiguous said sector;
   - each of said pickup terminals also including
     - receiver means for receiving identifying signals transmitted in the particular mode corresponding to the interrogating signal selected by a mobile unit within the sector, and
     - connection means for transferring identifying signals to the central office over a particular path which identifies the pickup terminal; and
   - said central office including
     - a memory, and
     - control means coupled to said connection means for storing in the memory data on the mobile unit identified by a received identifying signal in association with the pickup terminal identified by the particular path over which the identifying signal is received.

2. A locating system in accordance with claim 1 wherein said signal producing means of each pickup terminal includes a frequency source for producing a frequency signal of different frequency from that produced by the pickup terminals in contiguous sectors;

each mobile unit includes a tunable frequency source for producing a carrier frequency of different frequency for each frequency signal to be selected by the detection means, and identification code modulating means for modulating the carrier frequency from the tunable frequency source with a predetermined identifying signal for identifying the particular mobile unit; and said receiver means of each pickup terminal is operable to receive and to detect identifying signals transmitted on the particular carrier frequency corresponding to the frequency of the frequency signal transmitted by a mobile unit within the sector.

3. A locating system in accordance with claim 2 including pulsing means coupled to the array of pickup terminals for causing the pickup terminals in synchronism to radiate their associated frequency signals periodically in bursts with intervals between the bursts;

and wherein said receiver means of each mobile unit is operable to receive frequency signals from the pickup terminals in the array and to produce output signals indicative of the amplitude of the received frequency signals;

said detection means of each mobile unit is operable to receive the output signals from said receiver means and produce an output signal indicative of the frequency signal having the greatest amplitude;

each mobile unit includes control means for tuning the frequency of the tunable frequency source to a particular frequency as determined by the received frequency signal having the greatest amplitude; and said control means of each mobile unit is operable in response to a change in the output signal of the detection means, indicating a change of received frequency signal of greatest amplitude, to cause the carrier frequency as modulated by the identification code modulating means to be transmitted during the subsequent interval between bursts.

4. A locating system in accordance with claim 3 wherein said central office includes signal receiver means for decoding said identifying signals and for providing output data designating the mobile unit identified by an identifying signal;

switching means;

switch control means connected to the switching means;

memory control means connected to the signal receiver means and to the memory; and input control means for coupling the connection means of a pickup terminal to the switching means, the switch control means, and the memory control means in response to receiving an identifying signal transferred over the particular connection means;

said switch control means being operable to cause the switching means to connect the particular connection means to the signal receiver means in response to coupling of the particular connection means to the switch control means;

said signal receiver means being operable to receive the identifying signal when connected to the connection means by the switching means, decode the identifying signal being transferred over the connection means, and provide output data designating the particular mobile unit identified by the identifying signal; and said memory control means being operable to store in the memory data designating the particular mobile unit from the signal receiver means in association with data on the particular pickup terminal determined from the particular connection means coupled to the memory control means by the input control means.

5. A locating and communicating system for determining the location of mobile units within a geographic area and for providing communication between mobile units and a central office comprising a central office;

an array of pickup terminals arranged throughout the geographic area, each pickup terminal being located within a different sector of the geographic area;

a connection means between each pickup terminal and the central office;

said central office including transmission means operable to be coupled to a connection means for transferring communication signals to a pickup terminal;

each pickup terminal including signal producing means for producing an interrogating signal which is different from the interrogating signal produced by the pickup terminals in contiguous sectors, and transmitter means for radiating the interrogating signal throughout the associated sector and for radiating communication signals received from the central office throughout the associated sector in a particular mode which is different from the particular modes in contiguous sectors;

a plurality of mobile units adapted to move from sector to sector throughout the geographic area;

each mobile unit including first receiver means for receiving interrogating signals from the pickup terminals in the array, detection means for selecting the interrogating signal of the pickup terminal associated with the sector in which the mobile unit is located from the interrogating signals of pickup terminals in contiguous sectors, second receiver means connected to said detection means and operable to receive communication signals in the particular mode radiated by the pickup terminal radiating the interrogating signal selected by the detection means, transmitter means connected to the detection means for transmitting in a particular mode determined by the interrogating signal selected by said detection means, the particular mode of transmitting being different from the particular modes of transmitting determined by selecting of the interrogating signals radiated by pickup terminals in sectors contiguous said sector, identification signal producing means for producing an identifying signal containing encoded data identifying the mobile unit, communication signal producing means for producing communication signals, means connected to the detection means and operable to couple the identification signal producing means to the transmitter means when the mobile unit moves into the sector from another sector causing the detection means to select the interrogating signal from the pickup terminal associated with said sector, thereby enabling the transmitter means to transmit the identifying signal in the particular mode, and means selectively operable to couple the communication signal producing means to the transmitter means thereby enabling the transmitter means to transmit communication signals in the particular mode;

each of the pickup terminals also including receiver means for receiving signals transmitted in the particular mode corresponding to the interrogating signal selected by a mobile unit within the sector and for coupling the signals to the connection means between the pickup terminal and the central office; and said central office also including a memory, control means coupled to said connection means for storing in the memory data on the mobile unit identified by a received identifying signal in association with the pickup terminal identified by the particular connection means over which the identifying signal is received, and
communication signal receiver means operable to be coupled to a connection means for receiving communication signals.

6. A locating and communicating system in accordance with claim 5 wherein
each pickup terminal includes
a frequency source for producing a frequency signal of different frequency from that produced by the pickup terminals in contiguous sectors, the frequency signal serving as an interrogating signal, and
modulator means connected to the connection means and to the frequency source and operable to modulate the frequency signal with communication signals from the central office,
each mobile unit includes
a tunable frequency source for producing a carrier frequency of different frequency for each frequency signal to be selected by the detection means,
identification code modulating means for modulating the carrier frequency from the tunable frequency source with a predetermined identifying signal for identifying the particular mobile unit, and
communication signal modulating means for modulating the carrier frequency source with communication signals; and
said receiver means of each pickup terminal is operable to receive and to detect signals transmitted on the particular carrier frequency corresponding to the frequency of the frequency signal transmitted by a mobile unit within the sector.

7. A locating and communicating system in accordance with claim 6 including
pulsing means coupled to the array of pickup terminals for causing the pickup terminals in synchronism to radiate their associated frequency signals periodically in bursts with intervals between bursts;
and wherein
said first receiver means of each mobile unit is operable to receive frequency signals from the pickup terminals in the array and to produce output signals indicative of the amplitude of the received frequency signals;
said detection means of each mobile unit is operable to receive the output signals from said first receiver means and produce an output signal indicative of the frequency signal having the greatest amplitude; and
each mobile unit includes control means for tuning the frequency of the tunable frequency source to a particular frequency as determined by the received frequency signal having the greatest amplitude.

8. A locating and communicating system in accordance with claim 7 wherein
each mobile unit includes
signaling modulating means for modulating the carrier frequency from the tunable frequency source with a predetermined calling signal for identifying the particular mobile unit, and
means selectively operable to couple the signaling modulating means to the transmitter means thereby enabling the transmitter means to transmit calling signals; and
said central office includes
signal receiver means for decoding said identifying signals and said calling signals and for providing output data designating the mobile unit identified by the signals and further providing output data indicating the presence of a calling signal,
a plurality of control units, each control unit having assigned thereto certain ones of the plurality of mobile units,
switching means,
switch control means connected to the switching means,
memory control means connected to the memory,
input control means for coupling the connection means from a pickup terminal to the switching means, the switch control means, and the memory control means in response to receiving a signal over the particular connection means,
said switch control means being operable to cause the switching means to connect the particular connection means to the signal receiver means in response to coupling of the particular connection means to the switch control means,
said signal receiver means being operable to receive identifying signals and calling signals when connected to the connection means by the switching means, decode the signal, provide output data designating the particular mobile unit identified by the signal, and further provide output data indicating the presence of a calling signal,
signal selector means connected to the signal receiver means and the memory control means and operable to transfer output data designating the mobile unit identified from the signal receiver means to the memory control means when the data does not indicate the presence of a calling signal,
said memory control means being operable to store in the memory data designating the particular mobile unit from the signal selector means in association with data on the particular pickup terminal determined from the particular connection means coupled to the memory control means by the input control means,
allocation means connected to the signal selector means and to the switch control means and having stored therein data on the certain ones of the mobile units assigned to each control unit, said allocation means being operable to transfer to the switch control means the designation of the particular control unit associated with the particular mobile unit identified by the output data from the signal receiver means when the data from the signal selector means indicates the presence of a calling signal,
said switch control means being operable to cause the switching means to disconnect the particular connection means from the signal receiver means and connect the particular connection means to the particular control unit in response to data from the allocation means identifying the control unit,
location lookup means connected to the switch control means and to the memory,
call signaling means connected to the location lookup means and to the control units and operable to enable a control unit to provide a call signal at the location lookup means identifying a particular mobile unit to be called,
said location lookup means being operable to search the memory and determine the particular pickup terminal associated with the mobile unit identified by the call signal and transfer to the switch control means the designation of the particular pickup terminal, and
said switch control means being operable to cause the switching means to connect the particular control unit to the connection means for the particular pickup terminal identified by the call signal.

* * * * *